(12) United States Patent
Pung et al.

(10) Patent No.: US 11,045,844 B2
(45) Date of Patent: Jun. 29, 2021

(54) CLEANING ARTICLE COMPRISING MULTIPLE SHEETS AND METHODS THEREOF

(71) Applicant: The Procter & Gamble Company, Cincinnati, OH (US)

(72) Inventors: David John Pung, Loveland, OH (US); Clint Stephen Winter, Holland, NY (US)

(73) Assignee: The Procter & Gamble Company, Cincinnati, OH (US)

( * ) Notice: Subject to any disclaimer, the term of this patent is extended or adjusted under 35 U.S.C. 154(b) by 76 days.

(21) Appl. No.: 16/137,556

(22) Filed: Sep. 21, 2018

(65) Prior Publication Data
US 2019/0091732 A1   Mar. 28, 2019

Related U.S. Application Data

(60) Provisional application No. 62/561,823, filed on Sep. 22, 2017.

(51) Int. Cl.
| | | |
|---|---|---|
| B08B 1/00 | (2006.01) | |
| A47L 13/17 | (2006.01) | |
| B32B 5/32 | (2006.01) | |
| C08G 12/32 | (2006.01) | |
| C11D 3/37 | (2006.01) | |
| C11D 17/04 | (2006.01) | |

(52) U.S. Cl.
CPC .............. *B08B 1/006* (2013.01); *A47L 13/17* (2013.01); *B32B 5/32* (2013.01); *C08G 12/32* (2013.01); *C11D 3/3703* (2013.01); *C11D 17/049* (2013.01); *B32B 2266/0285* (2013.01); *B32B 2307/72* (2013.01); *B32B 2432/00* (2013.01); *C08G 2110/005* (2021.01)

(58) Field of Classification Search
CPC .............. B32B 5/32; B32B 2266/0285; B32B 2307/72; B32B 2432/00; B08B 1/006
See application file for complete search history.

(56) References Cited

U.S. PATENT DOCUMENTS

| | | |
|---|---|---|
| 7,714,031 B2 | 5/2010 | Baumgartl et al. |
| 2005/0202232 A1* | 9/2005 | Sauniere ............. B29C 44/5654 428/316.6 |
| 2006/0005338 A1 | 1/2006 | Ashe et al. |
| | (Continued) | |

FOREIGN PATENT DOCUMENTS

| | | |
|---|---|---|
| EP | 0111860 A2 | 6/1984 |
| WO | WO2007/080553 A2 | 7/2007 |

OTHER PUBLICATIONS

International Search Report; International Application No. PCT/US/2018/052098; dated Nov. 28, 2018; 12 pages.

*Primary Examiner* — Hai Vo
(74) *Attorney, Agent, or Firm* — John T. Dipre (57) ABSTRACT

The present invention relates to a cleaning article that includes a cleaning article that includes melamine-formaldehyde foam. The melamine-formaldehyde foam includes at least two sheets and has a density above 12 kg/m³. Each sheet is from about 0.5 to about 4 mm in thickness and the static COF between two sheets is greater than 6. Additionally the present invention encompasses processes for making and methods for cleaning hard surfaces with a cleaning article according to the present invention.

11 Claims, 5 Drawing Sheets

(56) References Cited

U.S. PATENT DOCUMENTS

2011/0232680 A1    9/2011  Gonzales
2014/0230847 A1*   8/2014  Pung .................. A47L 13/17
                                                       134/6
2018/0140158 A1    5/2018  Pung et al.

* cited by examiner

CLEANING ARTICLE COMPRISING MULTIPLE SHEETS AND METHODS THEREOF

TECHNICAL FIELD

The present invention relates to cleaning articles based on melamine-formaldehyde foams and methods thereof, and more particularly to cleaning articles that include multiple sheets having a density above 12 kg/m$^3$ and are from about 0.5 millimeters to about 4 millimeters in thickness.

BACKGROUND OF THE INVENTION

Recently, a novel application for such melamine-formaldehyde foams in the area of hard surface cleaning has been discovered. Indeed, cleaning articles of cut or molded pieces of such melamine-formaldehyde foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It has been observed that melamine-formaldehyde foam in particular shows good soil and/or stain removal performance when used to clean hard surfaces, on stains/soils such as marks on walls and furniture. Indeed, it has been observed that melamine foam in particular, when wetted with an appropriate solvent, such as tap water, removes soils and/or stains from a hard surface when the hard surface is brought into contact with the melamine foam. By "bringing into contact" it is meant wiping, swiping, rubbing or the like. In order for the melamine foam in particular to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, thick blocks of melamine foam have a tendency to retain the removed soils and stains and are difficult to clean. Further, thick blocks of melamine foam tend to be difficult for users to manipulate and fit into tight spaces and adequately contact surfaces having an irregular shape. Thus, there remains a need to balance the cleaning benefits associated with melamine foams against the negatives observed when the foam is too thick.

It is therefore, an objective of the present invention to provide a cleaning article, wherein the article is capable of effectively cleaning and removing soils and/or stains from hard surfaces whilst providing a good surface safety profile and at the same time limiting the negatives observed upon use.

It has been now found that above objective can be met by use of cleaning articles of melamine-formaldehyde foam that include multiple sheets that are from about 0.5 millimeters (mm) to about 4 millimeters (mm) in thickness. Indeed, the objectives are met by cleaning articles according to present invention based on such melamine-formaldehyde foam that include multiple sheets that are from about 0.5 mm to about 4 mm in thickness or the method of cleaning hard surfaces with the melamine-formaldehyde articles according to present invention.

The articles, processes and uses according to the present invention will now be described.

SUMMARY OF THE INVENTION

The present invention relates to a cleaning article that includes melamine-formaldehyde foam. The melamine-formaldehyde foam includes at least two sheets and has a density above 12 kg/m$^3$. Each sheet is from about 0.5 to about 4 mm in thickness and the static COF between two sheets is greater than 6.

The present invention also relates to a method of cleaning a hard surface that includes providing a melamine-formaldehyde foam article that includes at least two sheets, removing a sheet from the melamine-formaldehyde foam article and bringing the cleaning sheet into contact with the hard surface. The melamine-formaldehyde foam article has a density above 12 kg/m$^3$ and each sheet is from about 0.5 to about 4 mm in thickness The present invention further encompasses processes for making and methods for cleaning hard surfaces with a cleaning article according to the present invention.

DETAILED DESCRIPTION OF THE INVENTION

Cleaning Article

The cleaning article 10 herein is based on melamine-formaldehyde foam and includes multiple sheets 20. The sheets of melamine-formaldehyde foam are heat-compressed. By "heat-compressed", it is meant that the melamine-formaldehyde foam 20 has been subject to two operations: a heating step and a compression step, which may be performed simultaneously, as described in further detail herein.

By a "cleaning article" it is meant herein an article of manufacture of any suitable shape and/or size and/or volume suitable for cleaning, i.e., removing spots and/or stains from hard surfaces. In a highly preferred embodiment according to the present invention, the cleaning article herein is in a shape and/or size and/or volume suitable for use by a consumer to clean hard surfaces therewith. Examples of cleaning articles are wipers, brushes, cleaning cloths or cleaning granules.

In a preferred embodiment, the cleaning articles herein are suitable for cleaning/cleansing inanimate surfaces selected from the group consisting of household hard surfaces; dish surfaces; surfaces like leather or synthetic leather; and automotive vehicles surfaces.

In a highly preferred embodiment, the cleaning articles herein are suitable to clean household hard surfaces.

By "household hard surface", it is meant herein any kind of surface typically found in and around houses like kitchens, bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, Inox®, Formica®, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

Suitable shapes of the cleaning articles 10, such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning article has a shape selected from the group consisting of: cube shape, rectangular shape, pencil eraser shape, and cuboid shape.

Suitable volumes of the cleaning article herein may be from 1 $cm^3$ to 1,000 $cm^3$, preferably from 10 $cm^3$ to 1,000 $cm^3$, more preferably from 10 $cm^3$ to 100 $cm^3$.

In a highly preferred embodiment herein, the cleaning article 10 herein has a cuboid shape defined by three groups of parallel and equal length sides, referred to as a, b and c, wherein a ranges from 2 cm to 20 cm, preferably 6 cm to 13 cm, b ranges from 2 cm to 20 cm preferably 12 cm to 18 cm, and c ranges from 0.05 cm to 6.0 cm, preferably, 0.1 cm to 4.0 cm, and most preferably 0.2 cm to 2.0 cm.

Figure 1:
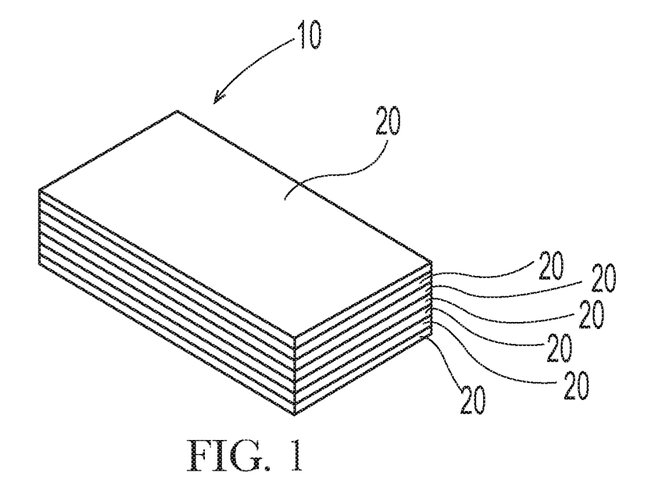
FIG. 1 is a perspective view of a cleaning article 1 comprising multiple sheets.

The cleaning article 10 of the present invention as shown in FIG. 1 comprises multiple sheets 20. In one preferred embodiment, the melamine-formaldehyde foam includes at least two, three, five or seven sheets 20. In one particularly preferred embodiment, the melamine-formaldehyde foam includes at least ten sheets or twenty sheets 20.

In a preferred embodiment according to the present invention the cleaning articles herein may comprise additional layers of material. In one embodiment, the cleaning article herein may comprise at least two sheets 20 and said cleaning article additionally comprises a second layer of material. Even more preferably, said second layer of material is a second foam layer 30 made of a second foam material as discussed herein below. Such a cleaning article according to this preferred embodiment is shown in FIG. 2.

The sheets of melamine-formaldehyde foam 20 and second layer 30 may be arranged in said cleaning article in any way suitable. In a preferred embodiment according to present invention the sheets of melamine-formaldehyde foam 20 and second layer 30 are arranged parallel to at least one side, preferably two opposite sides, of the cleaning article. However, the cleaning article may also have an irregular shape. Indeed, the thickness of the layers may be constant or vary throughout the cleaning article. The separation line 40 between the sheets of melamine-formaldehyde foam 20 and second layer 30 may form a straight line or may form a bend or be completely irregular. In addition, the separation plane of the layers may be in the center of cleaning article, dividing the article in two equal parts, or may be in the upper or lower part of the article. In addition, the cleaning article may be in the shape of a sphere or a globule or an ellipsoid with the separation plane between the sheets of melamine-formaldehyde foam 20 and second layer 30 forming a spherical segment or one of the layers, preferably the layer of a second layer here, forming a sphere in a sphere (similar to the layers of an onion).

Figure 2:
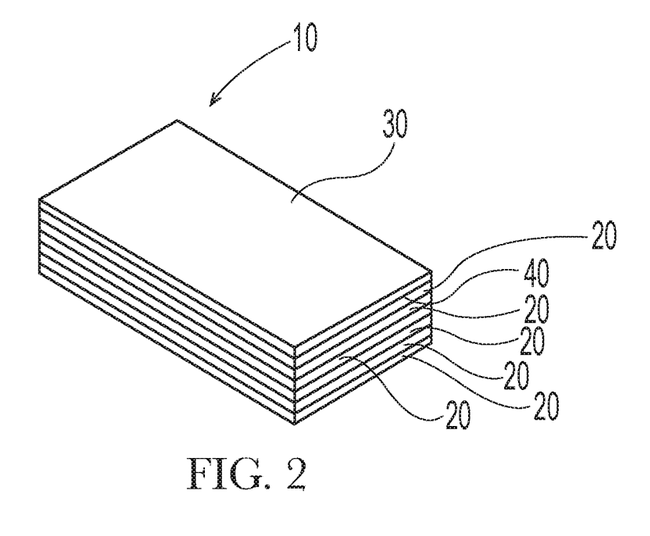
FIG. 2 is a perspective view of a cleaning article 1 comprising a second layer.
Figure 3:
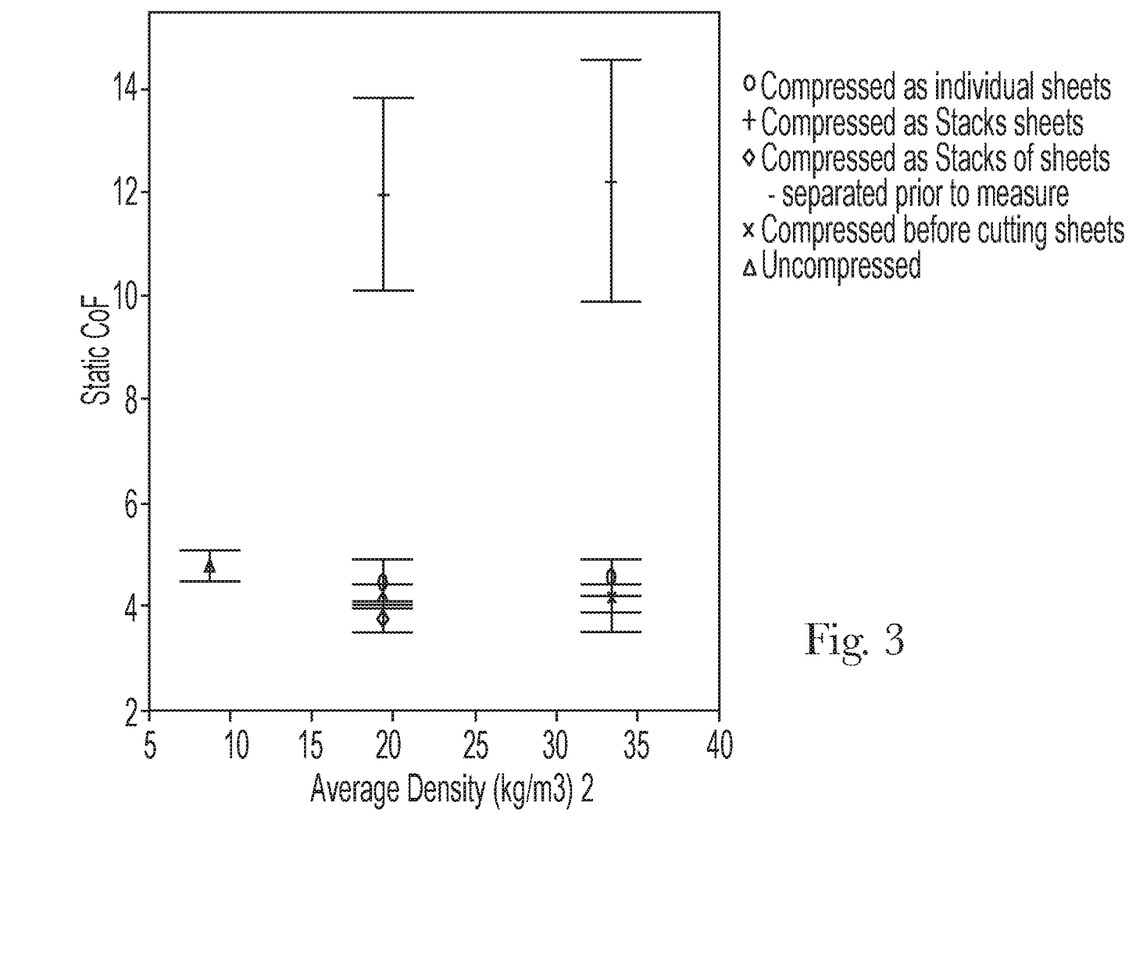
FIG. 3 is a graphical representation of static COF versus density ratio of the cleaning article of the claimed invention and uncompressed articles.

In this highly preferred embodiment of the present invention, wherein the cleaning article 10 herein has a cuboid shape, the line indicating the separation 40 between the sheets of melamine-formaldehyde foam 20 and second layer 30 (or the surface areas where the two are joined together) of the article is preferably substantially parallel (preferably parallel) to the side of the cuboid shaped article having the largest surface area (as shown in FIG. 2).

In another highly preferred embodiment herein the cleaning article herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning article herein has the shape of a pencil eraser, the line indicating the separation between the sheets of melamine-formaldehyde foam 20 and second layer 30 (or the surface areas where the two layers are joined together) of the article is preferably substantially parallel (preferably parallel) to the side of article in the shape of a pencil eraser having the largest surface area.

In order to obtain suitable cleaning articles according to a preferred embodiment of the present invention, the sheets of the melamine-formaldehyde foam layer 20 and the second layer 30 have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the melamine-formaldehyde foam comprising linear polymer herein or the second foam herein) over an open flame, which creates a thin layer of molten foam/polymer. Second foam (either the second foam herein or the melamine-formaldehyde foam comprising linear polymer herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The second layer 30, if present, may be of the same or similar materials as the sheets of melamine-formaldehyde foam or said second layer may be made of another material as known in the art. Indeed, the cleaning article herein may be in a so-called sandwich configuration, wherein three layers are present. In a preferred embodiment, wherein the cleaning article herein is in a sandwich configuration, the middle layer may be said second layer and at least one of the two outer layers are sheets of melamine-formaldehyde foam with the second outer layer being either sheets of melamine-formaldehyde foam or another material providing another feature, such as abrasiveness or increased rigidity. In a highly preferred embodiment according to the present invention the cleaning article herein comprises two outer layers of said sheets of melamine-formaldehyde foam and an inner layer, preferably of a second material to provide rigidity, as discussed herein below.

The sheets and layers of the cleaning article according to the present invention may cover each other either partially or fully. By a "partial coverage" it is meant that at least one of the sheets or layers overlaps the other sheets or layers (or other sheets or layers, if any) and is not fully covered by said other sheets or layers (or other sheets or layers, if any). By a "full coverage" it is meant that the sheets or layers of the cleaning article do fully cover each other and that none of the sheets or layers substantially overlap the other sheets or layer (or other sheets or layers, if any).

The ratio of said sheets of melamine-formaldehyde foam to said second layer in the cleaning article according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In one particularly preferred embodiment, the article only comprises the sheets of melamine-formaldehyde foam and does not comprise a second layer.

In order to obtain suitable cleaning articles according to the present invention, the sheets of melamine-formaldehyde foam and second layer, if present, raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Melamine-formaldehyde foams as such and their production and also linear polymers as such and their production are known to a person skilled in the art and described in the literature.

The melamine-formaldehyde foams of the present invention comprise at least one linear polymer. The at least one linear polymer preferably has an average number molecular weight $M_n$ in the range from 1000 to 8000 g/mol. Most preferably the linear polymer has a number average molecular weight $M_n$ in the range from 3000 to 5000 g/mol. The number average molecular weight $M_n$ can be calculated from the OH number according to DIN 53240. Preferably 0.1 to 5 parts by weight, more preferably 0.3 to 2 parts of the at least one linear polymer is used per 100 parts of melamine-formaldehyde precondensate. Preferably, the linear polymer is hydrophilic. The water solubility of the linear polymer preferably is more than 5% per weight, more preferably more than 10% per weight. Preferably, the linear polymer comprises at least a terminal hydroxyl group. The linear polymer consists preferably of the elements carbon, hydrogen and oxygen. Most preferably, polyethylene glycol is used as the linear polymer.

The sheets of melamine-formaldehyde foam of the present invention are preferably obtainable by the consecutive process steps a) and b):
 a) heating to foam up and crosslink a mixture comprising a melamine-formaldehyde precondensate having a molar ratio of melamine-formaldehyde in the range of typically from 1:1.3 to 1:5 and preferably from 1:2.5 to 1:3.5, at least one linear polymer, a curative, a dispersant and a blowing agent, and
 b) drying the foam obtained in process step a),
wherein these process steps and also the melamine-formaldehyde precondensates, curatives, dispersants and blowing agents useful in step a) are known in principle to a person skilled in the art and are described in the literature.

The melamine-formaldehyde precondensate in addition to melamine and formaldehyde may comprise up to 50% by weight and preferably up to 20% by weight (all based on the weight of cocondensed melamine) of other thermoset-formers and up to 50% by weight and preferably up to 20% by weight (all based on the weight of cocondensed formaldehyde) of other aldehydes in cocondensed form. Useful thermoset-formers include for example: alkyl- and arylalkyl-substituted melamine, urea, urethanes, carboxamides, dicyandiamide, guanidine, sulfurylamide, sulfonamides, aliphatic amines, glycols, phenol and its derivatives. Examples of useful other aldehydes are acetaldehyde, trimethylolacetaldehyde, acrolein, benzaldehyde, furfurol, glyoxal, gluteraldehyde, phthalaldehyde and terephthalaldehyde. Particular preference is given to an unmodified melamine-formaldehyde precondensate, i.e., a melamine-formaldehyde precondensate devoid of any other thermoset-formers or other aldehydes. Further details concerning melamine-formaldehyde condensation products may be found in Houben-Weyl, Methoden der organischen Chemie, volume 14/2, 1963, pages 319 to 402.

Commercially available melamine-formaldehyde precondensates are useful for a multiplicity of fields of use, for example for further processing into glues. Melamine-formaldehyde precondensates comprising sulfite groups are advantageous for use in some of these fields. Such sulfite group-containing melamine-formaldehyde precondensates are obtainable for example as described in EP-B 37470 whereby from 1% to 20% by weight of sodium disulfite is incorporated in the course of the condensation of melamine and formaldehyde to obtain cocondensed sulfite groups.

For the processes of the present invention, however, it is advantageous that step a) utilizes a precondensate which is free of the sulfite groups.

Emulsification of the blowing agent and stabilization of the foam in step a) requires the addition of a dispersant, e.g., an emulsifier or emulsifier mixture. Useful emulsifiers include anionic, cationic and nonionic surfactants and also mixtures thereof.

Suitable anionic surfactants are diphenylene oxide sulfonates, alkane- and alkylbenzenesulfonates, alkylnaphthalenesulfonates, olefinsulfonates, alkyl ether sulfonates, fatty alcohol sulfates, ether sulfates, alpha-sulfo fatty acid esters, acylaminoalkanesulfonates, acyl isethionates, alkyl ether carboxylates, N-acylsarcosinates, alkyl and alkyl ether phosphates. Useful nonionic surfactants include alkylphenol polyglycol ethers, fatty alcohol polyglycol ethers, fatty acid polyglycol ethers, fatty acid alkanolamides, EO-PO block copolymers, amine oxides, glycerol fatty acid esters, sorbitan esters and alkylpolyglucosides. Useful cationic emulsifiers include alkyltriammonium salts, alkylbenzyldimethylammonium salts and alkylpyridinium salts. The emulsifiers are preferably added in amounts of 0.2% to 5% by weight, based on the melamine-formaldehyde precondensate.

For the melamine-formaldehyde precondensate, which is preferably used in the form of an aqueous solution or dispersion, to produce foam in step a), it has to comprise a blowing agent, the amount depending on the desired density of the foam. In principle, the process of the present invention can utilize both physical blowing agents and chemical blowing agents. Useful physical blowing agents include, for example, hydrocarbons, halogenated and more particularly fluorinated hydrocarbons, alcohols, ethers, ketones and esters in liquid form or air and $CO_2$ as gases. Useful chemical blowing agents include, for example, isocyanates mixed with water, in which case $CO_2$ is released as an effective blowing agent, moreover carbonates and bicarbonates mixed with acids, which likewise produce $CO_2$, and also azo compounds, such as azodicarbonamide. In one preferred embodiment of the present invention, the aqueous solution or dispersion of the melamine-formaldehyde precondensate is admixed with between 1% and 40% by weight, based on the melamine-formaldehyde precondensate, of a physical blowing agent having a boiling point of between 0 and 80° C.; in the case of pentane, the amount used is preferably in the range from 5% to 15% by weight.

Curatives used in step a) comprise acidic compounds catalyzing the continued condensation of the melamine-formaldehyde precondensate. The amounts are between 0.01% and 20% by weight and preferably between 0.05% and 5% by weight, based on the melamine-formaldehyde precondensate. Organic and inorganic acids can be used, examples being hydrochloric acid, sulfuric acid, phosphoric acid, nitric acid, formic acid, acetic acid, oxalic acid, toluenesulfonic acids, amidosulfonic acids and also acid anhydrides.

The aqueous solution or dispersion of the melamine-formaldehyde precondensate used in step a) is preferably free of further added substances. However, it can be beneficial for some purposes to add up to 20% by weight, and preferably less than 10% by weight, based on the melamine-formaldehyde precondensate, of customary added substances, such as dyes, flame retardants, UV stabilizers, agents to lower combustion gas toxicity or to promote carbonization. Since the foams are generally open celled and capable of imbibing water, some applications make it necessary to add hydrophobicizers in amounts of 0.2% to 5% by weight. Useful hydrophobicizers include for example silicones, paraffins, silicone surfactants, fluorosurfactants, hydrophobic hydrocarbonaceous surfactants, silicone emulsions and fluorocarbon emulsions.

The concentration of the melamine-formaldehyde precondensate in the mixture of precondensate and solvent/dispersant, more particularly water, can vary within wide limits between 55% and 85% by weight and preferably between 63% and 80% by weight, all based on the total weight of melamine-formaldehyde precondensate and solvent/dispersant. The preferred viscosity of the mixture of precondensate and solvent/dispersant is between 1 and 3000 dPa·s and preferably between 5 and 2000 dPa·s.

Further mixture components may be mixed with the aqueous solution or dispersion of the melamine-formaldehyde precondensate to form a homogeneous mixture, with the blowing agent being forced in under pressure if necessary. However, it is also possible to start with a solid, for example spray-dried, melamine-formaldehyde precondensate and to subsequently mix it with a dispersion of the linear polymer and/or with an aqueous solution of the emulsifier, with the curative and also with the blowing agent. After mixing, the heated resin mixture with the dispersed blowing agent is discharged through a die and foams up thereafter.

Foaming of the blowing agent-containing solution or dispersion upon emergence from the die is augmented—as described in EP-B 17671—by means of hot air or high frequency irradiation. Preferably, the energy can be input by electromagnetic radiation, for example by high frequency irradiation with 5 to 400 kW, preferably 5 to 200 kW, particularly preferably 9 to 120 kW per one kilogram of the mixture used in a frequency range of 0.2 to 100 GHz, preferably 0.5 to 10 GHz. Magnetrons are a suitable source of radiation for dielectric radiation, with one or more magnetrons being able to be irradiated at the same time.

The mixture to be foamed is irradiated immediately on emerging from the foaming die. The blowing agent evaporates the resin mixture foams up and at the same time cures through.

The foams produced are finally dried to remove water and blowing agent remaining in the foam.

In a further embodiment of the process according to the present invention, process step b) may be followed by a process step c) in which the dried foam is cut into two, five, ten, twenty, fifty, a hundred or even two-hundred sheets. In one embodiment, process step c) further includes cutting the dried foam to leave at least a portion of the foam uncut along at least a portion and, preferably along all, of one edge of the foam.

In yet another embodiment of the process according to the present invention, process c) may be followed by process d) in which the multiple sheets are press molded to make them elastic.

Process step d) is known in principle to a person skilled in the art and is described in the literature, for example in EP-A 1 505 105 and EP-B 37470.

The foam blocks or sheets obtained can optionally be thermocompressed in a further process step. Thermocompression as such is known to a person skilled in the art and described for example in WO 2007/031944, EP-A 451 535, EP-A 111 860 and U.S. Pat. No. 6,608,118.

In general, the melamine-formaldehyde foams according to the present invention have a density of 10 to 100 kg/m$^3$, preferably 12 to 50 kg/m$^3$, more preferably 18 to 36 kg/m$^3$.

Figure 4:
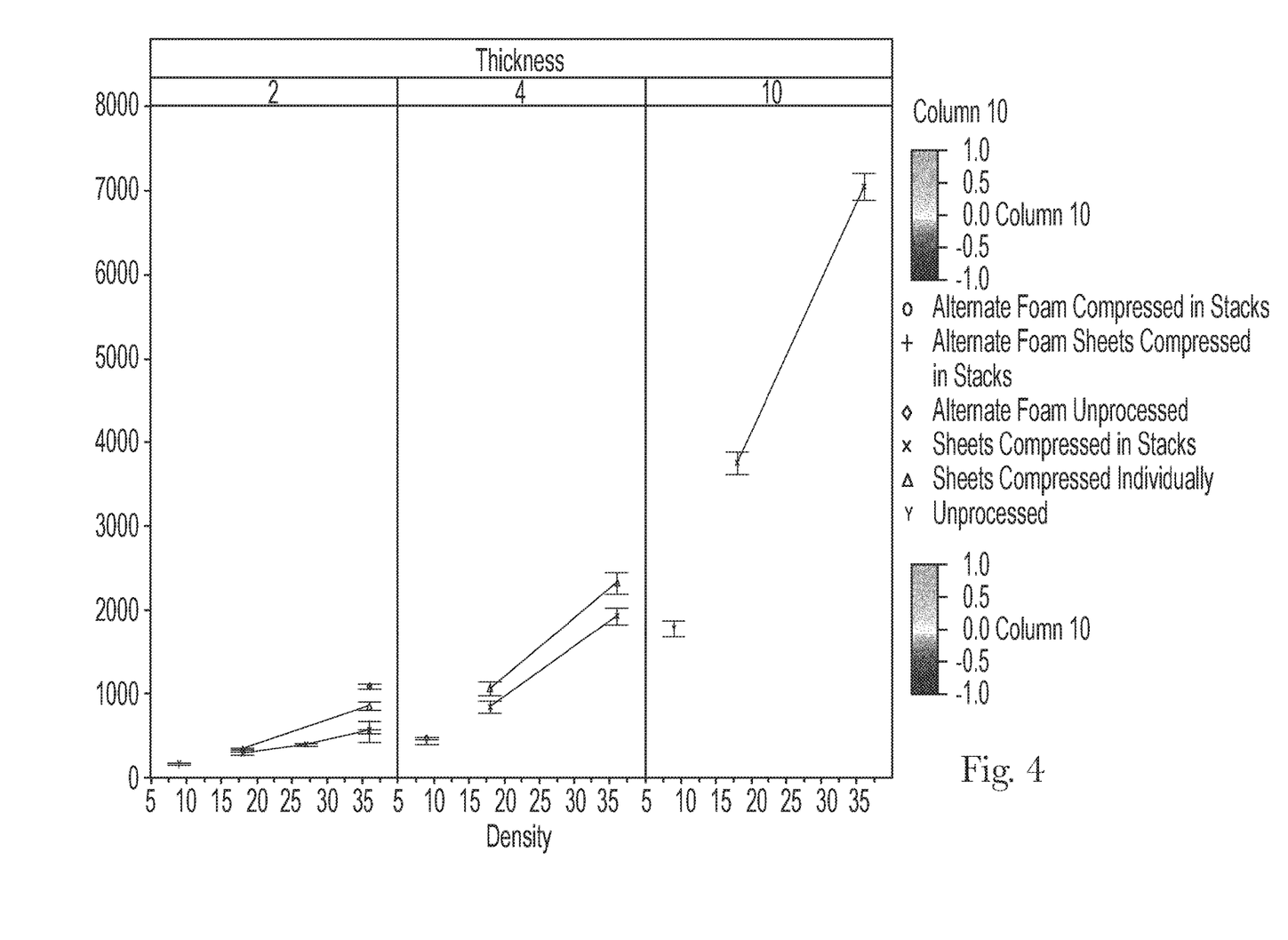
FIG. 4 is a graphical representation of circular bend (stiffness) versus the density and thickness of a sheet.

As shown in FIG. 4's graphical representation, the melamine foams of the present invention have a better elasticity and are able to handle larger amount of stress without breaking than conventional foams.

Figure 5:
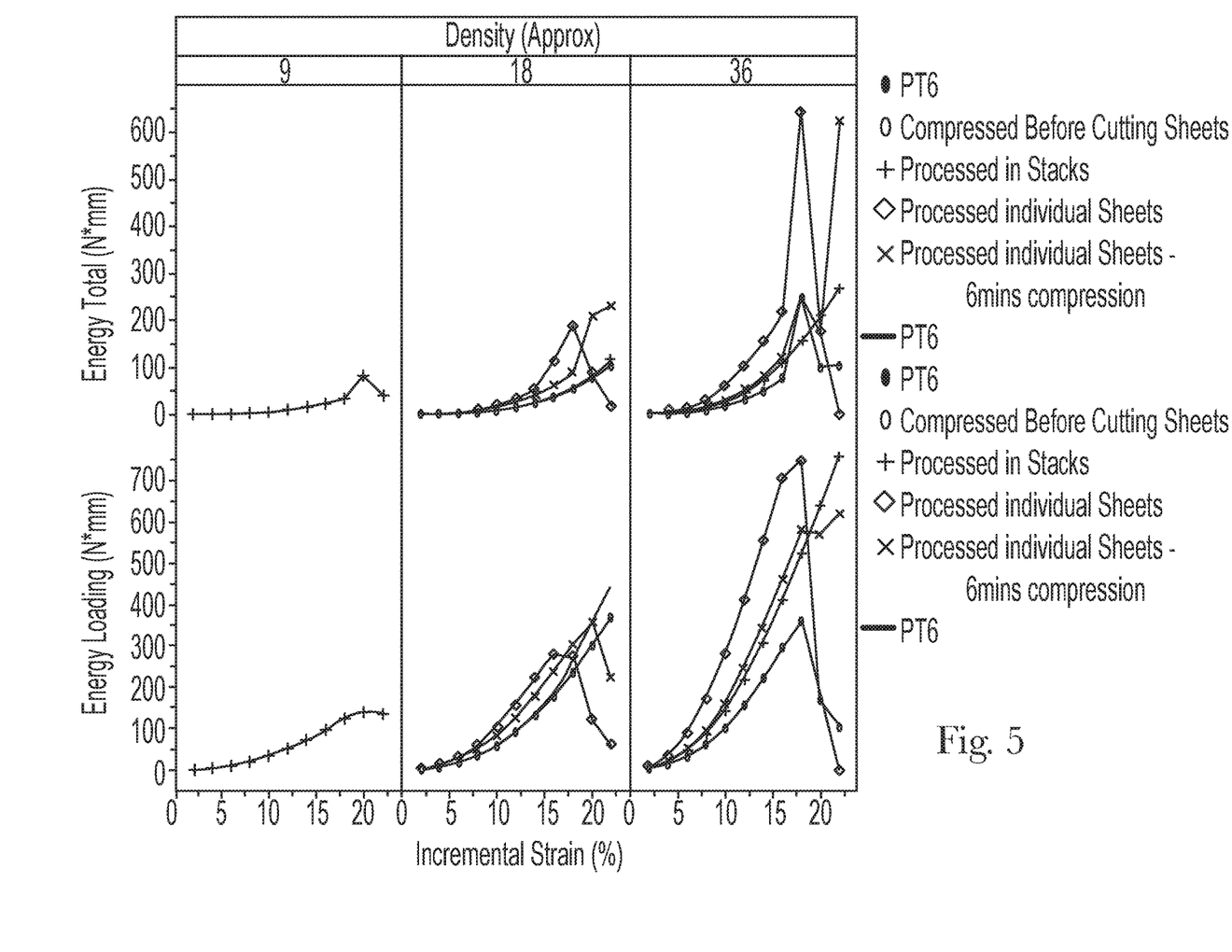
FIG. 5 is a graphical representation of tensile elongation over a series of increasing strain rates.

As shown in FIG. 5's graphical representation, the melamine foams of the present invention have a better stiffness than conventional foams.

The cleaning article of multiple sheets on melamine-formaldehyde foams can be used for cleaning hard surfaces.

Second Layer

In a highly preferred embodiment, as discussed above, the cleaning article 10 herein may comprises (at least) one additional layer 30. The second layer 30 may comprise a foam, a film, a synthetic nonwoven, a cellulosic sheet, sustainable sheets and combinations thereof. Plural layers may comprise one or more of these materials and laminates thereof, including the same and/or different materials.

If a foam is selected for one or more of the layers, suitable foams are selected from the group consisting of polyurethane foams; polypropylene foams; polyethylene foams; cellulose foam sponges; naturally occurring sponges; open-cell polyester foams; and cross-linked polyethylene foams; and combinations thereof.

If a film is selected for one or more of the layers, the layer may comprise a polyolefinic sheet, as is known in the art.

The sheet may comprise polyethylene terephthalate, polypropylene, polyethylene naphthalate, low-density polyethylene, high-density polyethylene, etc. as are known in the art. The film layer may be smooth or textured, as described in commonly assigned U.S. Pat. No. 4,846,821. A film layer may have a basis weight of about 15 to about 60 gsm and/or a thickness ranging from about 0.01 to about 3 mm.

A synthetic nonwoven may be carded, thermally bonded, spunbonded, hydroentagled, etc., as are known in the art. The nonwoven may be of constant or variable basis weight and/or density. The nonwoven may be textured and/or comprise discrete apertures, as disclosed in commonly assigned U.S. Pat. No. 6,936,330. A nonwoven layer may have a basis weight of about 15 to about 120 gsm and/or a thickness ranging from about 0.01 to 3 mm.

A cellulosic sheet may be wet laid and comprise permanent and/or temporary wet strength resins, as are known in the art. The cellulosic sheet may comprise kraft grade or tissue grade paper. The cellulosic sheet may be of constant or variable basis weight and/or density, as disclosed in commonly assigned U.S. Pat. No. 5,277,761 or commonly assigned U.S. Pat. No. 4,637,859. A tissue grade cellulosic sheet may have a basis weight of about 15 to about 45 gsm and/or a thickness ranging from about 0.01 to about 3 mm.

If desired, the one or more of the layers may be made of sustainable materials and/or combinations and blends of sustainable and other materials, including polymers derived from Biorenewable materials. Sustainable materials may include polylactic acid (PLA), polyglycolic acid (PGA), polybutylene succinate (PBS), an aliphatic-aromatic copolyester optionally with high terephthalic acid content, an aromatic copolyester optionally with high terephthalic acid content, polyhydroxyalkanoate (PHA), thermoplastic starch (TPS) and mixtures thereof. Suitable materials are disclosed in commonly assigned U.S. Pat. No. 8,083,064.

If desired, the layer may comprise a laminate of two or more materials. For example, the second layer 30 may comprise a layer of polyolefinic film. This layer may be reinforced with a woven layer or yarn layer attached thereto. A woven layer may comprise a loose weave, providing loop material suitable for attachment to a hook surface. A yarn layer may comprise plural parallel or randomly laid yards, also providing loop material suitable for attachment to a hook surface. The woven and/or yarn layers may be thermally bonded to the second layer 30.

In another embodiment the second layer 30 may comprise any sheet which is flexible, impermeable to fluid and, in one embodiment, hydrophobic. As used herein, the term "impermeable" means that the material resists and, in some embodiments, prevents diffusion of moisture therethrough.

The thickness of said second layer 30, if any, is preferably up to 30 mm, preferably from 0.5 mm to 20 mm, more preferably from 1 mm to 15 mm, even more preferably from 2 mm to 10 mm, and most preferably from 4 mm to 8 mm. Furthermore, in the preferred embodiment herein, wherein the cleaning article comprises a second layer 3 the thickness of said layer is preferably from 7 mm to 100 mm, more preferably from 15 mm to 25 mm.

In a preferred embodiment herein, the total volume of said second layer 3 in the cleaning article herein is preferably from 10 cm$^3$ to 100 cm$^3$, more preferably from 20 cm$^3$ to 70 cm$^3$, even more preferably from 30 cm$^3$ to 60 cm$^3$, and most preferably from 40 cm$^3$ to 50 cm$^3$.

Benefit Agent

The cleaning articles herein may contain a benefit agent, located anywhere as known in the art. In one embodiment, the active agent is impregnated in the sheets of melamine-formaldehyde foam layer 20. In another embodiment, the benefit agent is embedded in the second layer 30. In yet another embodiment, the benefit agent is impregnated in the attachment means, as discussed above, that attaches the sheets of melamine-formaldehyde foam layer 20 to the second layer 30. It will be understood, however, that in still further embodiment that the benefit agent can be located in any or all of the sheets of melamine-formaldehyde foam layer 20, second layer 30 or attachment means, as known in the art. Suitable benefit agents are selected among a surfactant, a bleaching agent, a limescale reducing agent, a biocide, a solvent, a polymer, a solid, a colorant and mixtures thereof. In one embodiment, the benefit agent may have an HLB greater than about 5, alternatively greater than about 8 to about 14, alternatively greater than about 12. In another embodiment, the benefit agent may be present in free form in an amount from about 5% to about 20%, or from about 10% to about 15% by weight of the benefit agent. A benefit agent in free form means that the benefit agent is supplied to the cleaning article in its neat form whose release from the cleaning article is not purposefully controlled, delayed, or sustained. In some preferred embodiments, the benefit agent(s) is supplied to the cleaning article in forms, as known in the art, such that the release from the cleaning article is purposefully controlled, delayed, or sustained.

Surfactants that are suitable for the present invention can be nonionic, anionic, cationic, amphoteric and/or a zwitterionic surfactant. Suitable nonionic surfactants include alkoxylated fatty alcohol having the formula of RO(EO)e(PO)pH, where R is a hydrocarbon chain of from 2 to 24 carbon atoms, EO is ethylene oxide and PO is propylene oxide, e and p respectively representing the average degree of ethoxylation and propoxylation, are independently from 0 to 24, or R is a straight alkyl chain having from 6 to 22 carbon atoms, e is 5-12 and p is 0 (e.g. Lutensol™) Suitable cationic surfactants herein include derivatives of quaternary ammonium, phosphonium, imidazolium and sulfonium compounds. Preferred cationic surfactants herein are trimethyl quaternary ammonium compounds. Suitable amphoteric surfactants herein include amine oxides, betaine or ammonium sulfate or ammonium carboxylate, having the following formula $R_1R_2R_3NO$, $R_1R_2R_3NR_4SO_4$ or $R_1R_2R_3NR_4CO_2$ wherein each of $R_1$, $R_2$ and $R_3$ is independently a saturated substituted or unsubstituted, linear or branched alkyl groups of from 1 to 30, or from 8 to 18 carbon atoms, except for $R_4$ which preferably contain 3 saturated carbons. Preferred amine oxides herein are for instance natural blend $C_8$-$C_{10}$ amine oxides, and $C_{12}$-$C_{16}$ amine oxides, such as cetyl dimethyl amine oxide. Preferred betaine herein is cocamidopropyl betaine and lauramidopropyl betaine. Suitable anionic surfactants include alkyl diphenyl ether sulphonate and alkyl carboxylate. Other suitable anionic surfactants herein include water soluble salts or acids of the formula $ROSO_3M$ wherein R is preferably a $C_{10}$-$C_{24}$ hydrocarbyl, or $C_{12}$-$C_{18}$ alkyl or hydroxyalkyl, and M is H or a cation, such as sodium, potassium, lithium, or ammonium or substituted ammonium. Other suitable anionic surfactants include soap salts, $C_9$-$C_{20}$ linear alkylbenzenesulfonates, $C_8$-$C_{22}$ primary or secondary alkylsulfonates, sulfonated polycarboxylic acids, $C_8$-$C_{24}$ alkylpolyglycolethersulfates (containing up to 10 moles of ethylene oxide); alkyl ester sulfonates, sulfates of alkylpolysaccharides, alkyl polyethoxy carboxylates, such as those of the formula $RO(CH_2CH_2O)_kCH_2COO^-M^+$ wherein R is a $C_8$-$C_{22}$ alkyl, k is an integer from 0 to 10, and M is a soluble salt-forming cation. Resin acids and hydrogenated resin acids are also suitable. Further examples are given in "Surface Active Agents and Detergents" (Vol. I and II by Schwartz, Perry and Berch). A variety of such surfactants are also generally disclosed in U.S. Pat. No. 3,929,678.

Bleaching agents herein may be selected from a hydrogen peroxide source, a preformed peroxycarboxylic acid, a hypohalite bleach source, and a mixture thereof. Hydrogen peroxide sources herein include persulfate, dipersulphate, persulfuric acid, percarbonate, perborate, metal peroxide, perphosphate, persilicate, urea peroxyhydrate and a mixture thereof. Preformed peroxycarboxylic acids herein include those containing one, two or more peroxy groups, and can be aliphatic or aromatic. When the organic percarboxylic acid is aliphatic, the unsubstituted acid suitably has the linear formula: HO—O—C(O)—$(CH_2)_n$—Y, wherein Y is H, $CH_3$, $CH_2Cl$, COOH or C(O)OOH; n is an integer of 1-20. Branched analogs are also acceptable. When the organic percarboxylic acid is aromatic, the unsubstituted acid suitably has formula: HO—O—C(O)—$C_6H_4$—Y wherein Y is hydrogen, alkyl, alkylhalogen, halogen, —COOH or —C(O)OOH. Monoperoxycarboxylic acids useful as oxygen bleach herein are further illustrated by alkyl percarboxylic acids and aryl percarboxylic acids such as peroxybenzoic acid and ring-substituted peroxybenzoic acids, e.g., peroxy-α-naphthoic acid; aliphatic, substituted aliphatic and arylalkyl monoperoxy acids such as peroxylauric acid, peroxystearic acid, and N,N-phthaloylaminoperoxycaproic acid (PAP); and 6-octylamino-6-oxo-peroxyhexanoic acid. Peracids can be used in acid form or any suitable salt with a bleach-stable cation. Suitable hypohalite bleaching agents herein include those that form positive halide ions and/or hypohalite ions, and bleaching agents that are organic based sources of halides, such as chloroisocyanurates. Suitable hypohalite bleaching agents herein include alkali metal and alkaline earth metal hypochlorite, hypobromite, hypoiodite, chlorinated trisodium phosphate dodecahydrate, potassium and sodium dichloroisocyanurates, potassium and sodium trichlorocyanurates, N-chloroimides, N-chloroamides, N-chloroamines and chlorohydantoins.

Limescale reducing agents herein include, but are not limited to, acids and chelating agents. Exemplary acids useful herein include hydrochloric acid, phosphoric acid, sulfuric acid, sulfamic acid, acetic acid, hydroxyacetic acid, citric acid, benzoic acid, tartaric acid, formic acid and mixtures thereof. A mixture of organic and inorganic acid is preferred. Chelating agents useful herein can include, but are not limited to, carboxylates, phosphates, phosphonates, polyfunctionally-substituted aromatic compounds, polyamines, biodegradable compounds, the alkali metal, ammonium or substituted ammonium salts or complexes of these chelating agents, and mixtures thereof. Further examples of suitable chelating agents and levels of use are described in U.S. Pat. Nos. 3,812,044; 4,704,233; 5,292,446; 5,445,747; 5,531,915; 5,545,352; 5,576,282; 5,641,739; 5,703,031; 5,705,464; 5,710,115; 5,710,115; 5,712,242; 5,721,205; 5,728,671; 5,747,440; 5,780,419; 5,879,409; 5,929,010; 5,929,018; 5,958,866; 5,965,514; 5,972,038; 6,172,021; and 6,503,876.

Biocide means any known ingredient having the ability of reducing or even eliminating by killing or removing the micro-organisms existing on a surface, such as those described in U.S. Pat. No. 6,613,728. Biocide useful herein includes a quaternary surface active compound, a guanidine, an alcohol, a glycerol, a phenolic compound, a heavy metal salt, an inorganic and organic acid, a halogen, a halogen-containing compound, a dye, an essential oil, an oxidizing compound, an adsorbent, a fungicide, an algaecide and a mixture thereof. Exemplary quaternary surface active compounds include benzalkonium chloride, benzethonium chloride, cetyl pyridinium chloride, sodium tetradecyl sulfate, sichlorobenzalkonium chloride, methylbenzethonium chloride, cetyl dimethyl ethyl ammonium bromide. Exemplary guanidines include chlorohexidine hydrochloride, chlorohexidine gluconate, dodecylguanidine hydrochloride, polyhexmethylenebiguanidine hydrochloride, and 6-acetoxy-2,4-dimethylmetadioxane. Exemplary alcohols include methanol, ethanol, propanol, isopropanol, etc. Exemplary phenolic compounds include cresol, resolcinols and related compounds, phenol; substituted phenols-cresols, meta-cresylacetate, creosote, quaiacol, resorcinol, hexylresorcinol, pyrogallol, thymol, thymol iodide, picric acid, chlorinated phenols-dichlorophene, hexachlorophene, tars. Exemplary halogens and halogen-containing compounds include iodine and iodoform. Exemplary oxidizing agents include peroxide, sodium perporate, potassium permanganate, zinc permanganate, potassium chlorate. Exemplary heavy metal salts include mercuric chloride, miscellaneous ionizable mercuric salts, organic mercurials, silver nitrate, silver lactate, silver picrate, silver proteins, silver halides, zinc oxide, zinc stearate, copper sulfate and organic tin derivatives. Exemplary dyes include azo dyes, acridene dyes, fluorescein dyes, phenolphthalein dyes and triphenylmethane dyes. Exemplary inorganic and organic acids include hydrochloric acid, sulfuric acid, nitric acid, citric acid, sorbic acid, acetic acid, boric acid, formic acid, maleic acid, adipic acid, lactic acid, malic acid, malonic acid, glycolic acid, and mixtures thereof. Exemplary essential oils are thyme oil, clove oil, cinnamon oil, geranium oil, eucalyptus oil, peppermint oil, citronella oil, ajowan oil, mint oil or mixtures thereof. Other useful biocide herein includes furan derivatives, nitrofurantoin, sulfur, sulfur dioxide, ichthamol, chrysarobin, anthralin, betanaphthol, balsams, volatile oils, chlorophyl.

Biocides useful herein also include fungicides and algaecides which act against molds and mildew. Removal of algae and fungi from hard surfaces is difficult. Moreover, fungi and algae reappear promptly if not completely removed or inhibited. Suitable fungicides and algaecides include metal salts, such as zinc sulfate, zinc acetate, zinc bromide, zinc chloride, zinc iodide, zinc nitrate, zinc bromate and zinc chlorate, cooper halide, copper sulfate, organic tin derivatives, water-insoluble or partially water-soluble fungicides and algaecides, such as diiodomethyl p-tolyl sulfone, N-(trichloromethyl thio) phthalimide, N,N-dimethyl-N-phenyl N'-(fluorodichloromethyl thio) sulphamide, 2-(thiocyanomethylthio) benzothiazole/methylene bis(thiocyanate), 3-iodo-2-propynyl butyl carbamate, etc., all available from ALDRICH chemical. Above biocides are optionally mixed with concentrated acids, such as acetic acid, formic, propionic, n-butanoic, n-pentanoic, trimethylacetic, n-hexanoic, lactic, methoxyacetic, cyanoacetic, chloroacetic, citric, partaric, etc.

The benefit agent may be a solvent having a good dissolving ability for greasy stains. Solvents useful herein include those which are at least partially water-miscible, such as alcohols, ethers, such as diethylene glycol diethylether, diethylene glycol dimethylether, propylene glycol dimethylether, propylene glycol monomethylether, propylene glycol monoethylether, propylene glycol monopropylether, propylene glycol monobutylether, ethylene glycol monobutylether, dipropylene glycol monomethylether, dipropylene glycol monopropyl ether, dipropylene glycol monobutyl ether, diethyleneglycol monobutylether, lower esters of monoalkylethers of ethylene glycol or propylene glycol, such as propylene glycol monomethyl ether acetate, N-methyl pyrolidone and tetrahydrofuran. Mixtures of several solvents can also be used.

Polymers useful herein include polyolefins, polyesters, polyvinyl chlorides, polyamides, mixtures thereof and copolymers thereof. Specific examples of useful polymers include but are not limited to polypropylene, polyethylene, polybutylene, polystyrene, polyethylene terephthalate, polyamide, polyacrylate, polyvinyl chloride, polyvinyl alcohol, ethylene vinyl acetate copolymers and mixtures thereof.

Useful solids include abrasive materials or fillers which may be inorganic or organic materials, e.g. sand, lime ($CaCO_3$), silicates with an average particle diameter (number-average) in the range from about 1 μm to about 1 mm, or colloidal silica, preferably inorganic material are selected from oxides, chlorides, sulfates, phosphates, carbonates of Mg, Mn, Ba, Ca, W, Zr, Ti, Si, Mo, in particular $TiO_2$, $SiO_2$, sand and $Al_2O_3$. Other suitable materials are insoluble sodium polymetaphosphate, hydrated alumina, dicalcium orthophosphate dihydrate, calcium pyrophosphate, tricalcium phosphate, calcium polymetaphosphate. Other abrasive material may be Carbon based materials: i.e.: as refered as black carbon, activated carbon, charcoal, etc. and may be porous or not. Other abrasive material include microspheres. Particularly preferred inorganic fillers are selected from zeolite based materials and silica based materials. Suitable zeolite based materials are described in the following reference texts: ZEOLITE SYNTHESIS, ACS Symposium Series 398, Eds. M. L. Occelli and H. E. Robson (1989) pages 2-7; ZEOLITE MOLECULAR SIEVES, Structure, Chemistry and Use, by D. W. Breck, John Wiley b Sons (1974) pages 245-250, 313-314 and 348-352 (all of which are incorporated herein by reference). $SiO_2$ exists in a variety of crystalline forms and amorphous modifications, any of which are suitable for use herein. In particular, silicas having a high surface area or in agglomerated forms are preferred (i.e., clays or shells). Without being restrictive to a family of silica based materials, commonly silica which is in a highly purified form such that is contains at least about 90%, preferably about 95%, more preferably about 99% silicon dioxide (i.e.: a silica gel having a about 100% silica content, and fumed silica) is preferred. Alternatively, silica based materials may be provided from other sources such as metal silicates including sodium silicate. Further suitable materials are water-insoluble sodium polymetaphosphate, hydrated alumina, dicalcium orthophosphate dihydrate, calcium pyrophosphate, tricalcium phosphate, calcium polymetaphosphate.

Colorants useful herein include as dyes, pigments and mixtures thereof.

Packaging Means

The cleaning article herein may be combined in an article of manufacture with a packaging means.

The packaging means herein may be any suitable means known to package cleaning articles. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning article.

Method of Cleaning a Hard Surface

In another embodiment the present invention encompasses method of cleaning a hard surface with a cleaning article as described herein above.

In yet another embodiment herein, the present invention encompasses a method of cleaning a hard surface by bringing a cleaning article according to the present invention into contact with said hard surface. By "cleaning" it is meant herein removing spots and/or stains from hard surfaces.

In still another embodiment herein, the present invention encompasses a method of cleaning a hard surface with cleaning article according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning article or said foam with an appropriate solvent, preferably tap water, more preferably water in combination with a detergent composition, prior to bringing said cleaning article into contact with said hard surface.

In yet another embodiment herein, the present invention encompasses a method of cleaning a hard surface that includes providing the melamine-formaldehyde foam article that includes at least two sheets, removing a sheet from the melamine-formaldehyde foam article, optionally, adding a solvent (e.g., water) to the cleaning surface and bringing the cleaning sheet into contact with the hard surface. The melamine-formaldehyde foam article has a density above 12 $kg/m^3$ and each sheet is from about 0.5 to about 4 mm in thickness.

EXAMPLES

Figure 6:
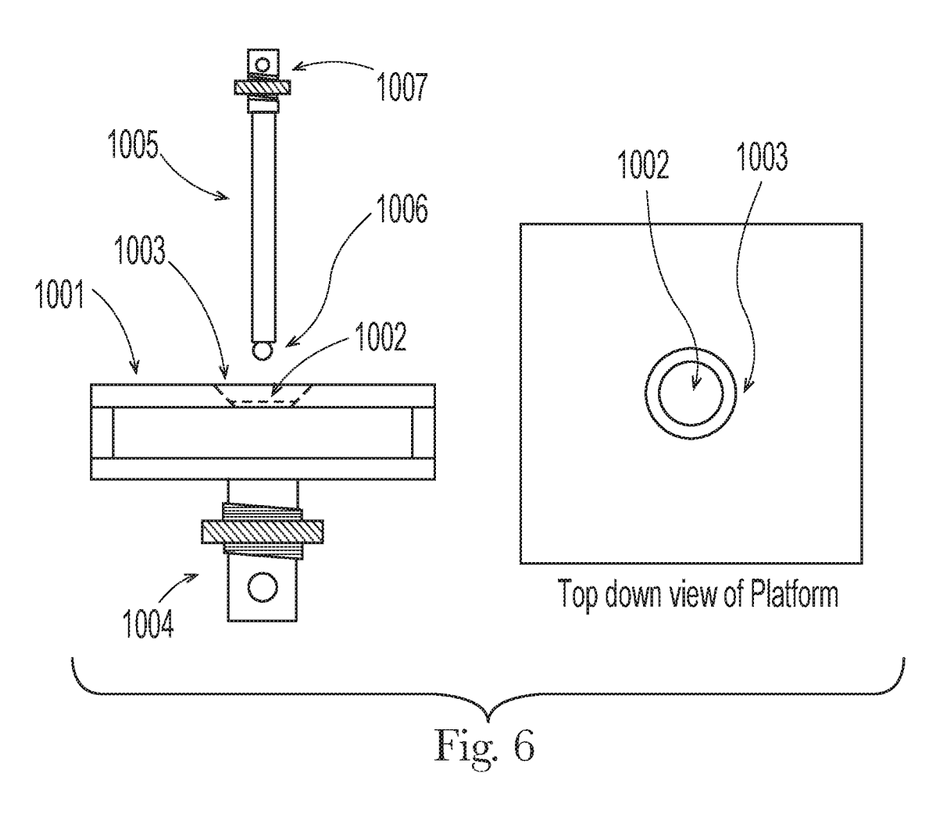
FIG. 6 is a representation of a tensile tester used in the Modified Circular Bend test.

Methods of Measurement:

As shown in FIG. 6, the Modified Circular Bend of a sample is measured on a constant rate of extension tensile tester (a suitable instrument is the MTS Alliance using Testworks 4.0 Software, as available from MTS Systems Corp., Eden Prairie, Minn.) using a load cell for which the forces measured are within 10% to 90% of the limit of the cell. All testing is performed in a room controlled at 23° C.±3° C. and 50%±2% relative humidity.

The bottom stationary fixture consists of a horizontal smooth-polished stainless steel platform 1001 which is 102.0 mm wide by 102.0 mm long by 6.35 mm thick. The platform has 18.75 mm diameter orifice 1002 at its center with a lap edge 1003 of that orifice having a 45 degree angle to a depth of 4.75 mm (i.e., the outer diameter of bevel is 28.25 mm). The fixture is constructed such that it has at least 20 mm of clearance underneath the platform. The platform 1001 has an adapter 1004 compatible with the mount of the tensile tester capable of securing the platform horizontally and orthogonal to the pull direction of the tensile tester. The upper fixture is a cylindrical plunger 1005 having an overall length of 70 mm with a diameter of 6.25 mm. The contact tip 1006 is a ball nose having a radius of 2.97 mm. The plunger has an adapter 1007 compatible with the mount on the load cell capable of securing the plunger orthogonal to the platform. Once assembled, the plunger is concentric with the orifice with equal clearance on all sides.

Samples are conditioned at 23° C.±3° C. and 50%±2% relative humidity four hours prior to testing. In order to perform the procedure for this test, as explained below, three or more representative specimens are necessary. The geometric center is tested as defined by the crossing point of lines that are drawn from the corners of the sheet. The test specimens should not be folded or bent by the test person, and the handling of specimens must be kept to a minimum and to the edges to avoid affecting flexural-resistance properties.

Set the gauge length to 25.0 mm from the bottom contact tip 1006 of the plunger to the bottom surface of the platform 1001. Program the tensile tester as a compression test, to lower the crosshead at 50.0 centimeter per minute for 25.0 mm and record force (N) and displacement (mm) at a data rate of 100 Hz, and then return the crosshead to its original gauge length.

Zero the crosshead and load cell. Position a specimen centered underneath the plunger with its center is in alignment with the plunger 1005. Begin the test and collect force (N) and displacement (mm) data. The plunger tip 1006 and platform 1001 including the orifice 1002, 1003 are cleaned with an alcohol wipe and allowed to dry completely between specimens. The above steps are repeated until all the identical specimens have been tested.

Construct a graph of force (N) verses displacement (mm). Read the Maximum Peak Force (N) from the graph and record to the nearest 0.01N. Repeat in like fashion for all specimens and report the arithmetic mean for Maximum Peak Force (N) to the nearest 0.01N.

Static CoF is run per ASTM D1894 with the following modifications: sled size is 2.5×2.5 in with a mass of 118 g. Sample size is 2.5×2.5 in and 2 mm thick. Larger samples may be cut to the correct dimensions using a sharp cutting implement that provides straight, non-jagged lines.

Emtec TSA Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2° C. and 50%±2%) for at least 1 hour prior to conducting the TSA testing, which is also conducted under TAPPI conditions.

Testing Procedure

Calibrate the instrument according to the manufacturer's instructions using the 1-point calibration method on Emtec reference 2× (nn·n) samples. If these reference samples are no longer available, use the appropriate reference samples provided by the manufacturer. Calibrate the instrument according to the manufacturer's recommendation and instruction, so that the results will be comparable to those obtained when using the 1-point calibration method on Emtec reference 2× (nn·n) samples.

Mount the test sample into the instrument, and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article comprising a segmented melamine-formaldehyde foam, wherein the segmented melamine-formaldehyde foam has a density above 12 kg/m$^3$ and comprises a stack of a plurality of segments adhered to each other in a direction of the thickness, wherein each segment is from about 0.5 to about 4 mm in thickness and the static Coefficient of Friction between two segments is greater than 6, wherein the segmented melamine-formaldehyde foam is prepared by cutting the foam into the plurality of segments in a direction perpendicular to the direction of the thickness, wherein the cutting is performed for less than a length of the foam such that the segments are not separated from each other, but held together in one piece by the portion extending along one edge of the foam.

2. The cleaning article according to claim 1, wherein the melamine-formaldehyde foam has a density is in the range from about 18 to about 36 kg/m$^3$.

3. The cleaning article according to claim 1, wherein the static Coefficient of Friction between two segments is greater than 8.

4. The cleaning article according to claim 1, wherein the static Coefficient of Friction between two segments is greater than 10.

5. The cleaning article according to claim 1, wherein the melamine-formaldehyde foam comprises at least five segments.

6. The cleaning article according to claim 1, wherein the melamine-formaldehyde foam comprises at least ten segments.

7. The cleaning article according to claim 1, wherein the melamine-formaldehyde foam has a TS750 Ratio greater than 1.2.

8. The cleaning article according to claim 1, wherein the melamine-formaldehyde foam comprised a benefit agent selected from the group consisting of a detergent composition; surfactants; dyes; inks; pigments; scents; acids; bases; oils; salts; bleach; antimicrobial agents; fragrances; solvents; biocides; hydrophobicizing agents; agents influencing haptics; agents influencing the soil release behavior; formaldehyde scavengers; and abrasives.

9. The cleaning article according to claim 1, further comprising a backing layer.

10. The cleaning article according to claim 1, wherein the melamine-formaldehyde foam has a density above 18 kg/m3, wherein each segment has a stiffness below 750.

11. The cleaning article according to claim 1, wherein the melamine-formaldehyde has a density above 18 kg/m3, wherein each segment has an incremental stress about 18% and an energy of 100.

* * * * *